(12) United States Patent
Sui et al.

(10) Patent No.: US 11,954,616 B2
(45) Date of Patent: Apr. 9, 2024

(54) INTELLIGENT STEREO GARAGE SYSTEM BASED ON INTERNET+ AND VEHICLE PARKING AND PICKUP METHODS

(71) Applicant: SHANDONG UNIVERSITY OF SCIENCE AND TECHNOLOGY, Shandong (CN)

(72) Inventors: Tao Sui, Shandong (CN); Chuanzhen Sun, Shangdong (CN); Xiuzhi Liu, Shangdong (CN); Shengrun Guo, Shangdong (CN); Zhizhong Huo, Shangdong (CN)

(73) Assignee: Shandong University of Science and Technology, Shandong (CN)

( * ) Notice: Subject to any disclaimer, the term of this patent is extended or adjusted under 35 U.S.C. 154(b) by 861 days.

(21) Appl. No.: 16/977,289

(22) PCT Filed: Jul. 16, 2018

(86) PCT No.: PCT/CN2018/095847
§ 371 (c)(1),
(2) Date: Sep. 1, 2020

(87) PCT Pub. No.: WO2019/174167
PCT Pub. Date: Sep. 19, 2019

(65) Prior Publication Data
US 2021/0004729 A1    Jan. 7, 2021

(30) Foreign Application Priority Data
Mar. 13, 2018  (CN) .......................... 201810202603.8

(51) Int. Cl.
*G06Q 10/02* (2012.01)
*G01C 21/34* (2006.01)
(Continued)

(52) U.S. Cl.
CPC ......... *G06Q 10/02* (2013.01); *G01C 21/3407* (2013.01); *G05B 19/042* (2013.01);
(Continued)

(58) Field of Classification Search
CPC ....................................................... G06Q 10/02
See application file for complete search history.

(56) References Cited

U.S. PATENT DOCUMENTS

| 2013/0085596 | A1* | 4/2013 | Shani | ..................... G08G 1/14 414/231 |
| 2015/0066545 | A1* | 3/2015 | Kotecha | ................. G06Q 10/02 705/5 |

(Continued)

FOREIGN PATENT DOCUMENTS

| CN | 105424055 A | 3/2016 |
| CN | 107134164 A | 9/2017 |

(Continued)

OTHER PUBLICATIONS

Barbanel, "More Apartment Buildings Are Offering the Hi-Tech Perk of Automated Parking," Mansion Global, Dec. 23, 2016, Retrieved from https://www.mansionglobal.com/articles/more-apartment-buildings-are-offering-the-hi-tech-perk-of-automated-parking-49572 (Year: 2016).*

*Primary Examiner* — Rupangini Singh
*Assistant Examiner* — Bryan J Kirk
(74) *Attorney, Agent, or Firm* — Hayes Soloway PC (57) ABSTRACT

An intelligent stereo garage system based on Internet+ and a vehicle parking and pick-up method. The system includes a mobile APP (10), a cloud server (20), a computer system (30), a programmable logic controller (PLC) system (40), a stereo garage (50), and an all-in-one touch machine (60), where the all-in-one touch machine (60) is deployed next to the stereo garage (50), and the computer system (30) is deployed outside or inside the stereo garage (50). A fully-
(Continued)

automatic parking method uses different parking and pick-up modes, which technically ensures that users can get their vehicles in time without hindering other users, and allows users to truly experience the system intelligence. This deeply embodies the smart city's idea of interconnecting everything with a mobile phone. The method largely solves problems such as parking difficulty, illegal parking, unauthorized charges, traffic jams, traffic noise, traffic accidents, and vehicle pollution.

7 Claims, 3 Drawing Sheets (51) Int. Cl.
| | |
|---|---|
| G05B 19/042 | (2006.01) |
| G05B 19/05 | (2006.01) |
| G06F 9/44 | (2018.01) |
| G06F 13/42 | (2006.01) |
| G06F 16/9537 | (2019.01) |
| G06K 19/06 | (2006.01) |
| G06Q 10/20 | (2023.01) |
| G06Q 20/20 | (2012.01) |
| G06Q 20/32 | (2012.01) |
| G06Q 30/016 | (2023.01) |
| G06Q 30/018 | (2023.01) |
| G06Q 30/0282 | (2023.01) |
| G06Q 30/0283 | (2023.01) |
| G06Q 40/08 | (2012.01) |

(52) U.S. Cl.
CPC ............... *G05B 19/05* (2013.01); *G06F 9/44* (2013.01); *G06F 13/42* (2013.01); *G06F 16/9537* (2019.01); *G06K 19/06037* (2013.01); *G06Q 10/20* (2013.01); *G06Q 20/202* (2013.01); *G06Q 20/206* (2013.01); *G06Q 20/209* (2013.01); *G06Q 20/326* (2020.05); *G06Q 20/3274* (2013.01); *G06Q 30/016* (2013.01); *G06Q 30/0185* (2013.01); *G06Q 30/0282* (2013.01); *G06Q 30/0284* (2013.01); *G06Q 40/08* (2013.01); *G05B 2219/2667* (2013.01); *G06F 2213/40* (2013.01); *G06Q 2240/00* (2013.01)

(56) References Cited

U.S. PATENT DOCUMENTS

| | | | |
|---|---|---|---|
| 2016/0042575 A1 | 2/2016 | Ganguly et al. | |
| 2019/0226225 A1* | 7/2019 | Tang | E04H 6/422 |
| 2020/0402402 A1* | 12/2020 | Howell | G08G 1/144 |

FOREIGN PATENT DOCUMENTS

| | | | | |
|---|---|---|---|---|
| CN | 206503411 U | 9/2017 | | |
| CN | 107610247 A | 1/2018 | | |
| CN | 105608923 B | 4/2019 | | |
| WO | WO-2014155271 A1 * | 10/2014 | | E04H 6/12 |

* cited by examiner

INTELLIGENT STEREO GARAGE SYSTEM BASED ON INTERNET+ AND VEHICLE PARKING AND PICKUP METHODS

CROSS REFERENCE TO RELATED APPLICATIONS

This application claims priority to PCT Application No. PCT/CN2018/095847, filed on Jul. 16, 2018, which claims priority to Chinese Application No. CN201810202603.8, filed Mar. 13, 2018, the entirety of which are incorporated by reference as if disclosed herein.

TECHNICAL FIELD

The present invention belongs to the technical field of stereo garage, and specifically, to an intelligent stereo garage system based on Internet+ and vehicle parking and pickup methods.

BACKGROUND

In recent years, cars have become an important part of people's life. While bringing convenience to people, cars also have a series of negative effects. The phenomena such as parking difficulty, illegal parking, and unauthorized charges are particularly prominent. Parking difficulty has further aggravated traffic jams, traffic noise, traffic accidents, and environmental pollution, and requires an urgent solution.

In recent years, many intelligent vehicle access systems have been rapidly developed in many countries as a new way to alleviate the difficulty of urban parking, effectively reducing the area occupied and saving land resources to the greatest extent. With the rapid development of the intelligent era, some new intelligent access methods and ideas have been proposed. Some mobile phone-based reservation and access methods are proposed, but few of them can be systematically implemented, and even fewer can completely realize separation of people and vehicles with one mobile phone.

SUMMARY

To resolve the foregoing technical problems in the prior art, the present invention proposes an intelligent stereo garage system based on Internet+ and vehicle parking and pick-up methods, which effectively overcome the shortcomings of the prior art.

To achieve the above objective, the present invention adopts the following technical solutions:

An intelligent stereo garage system based on Internet+ includes a mobile APP, a cloud server, a computer system, a PLC system, a stereo garage, and an all-in-one touch machine, where the all-in-one touch machine is deployed next to the stereo garage, and the computer system is deployed outside or inside the stereo garage;

the mobile APP is used to search for a stereo garage with free parking spaces, send a command to the cloud server, and receive parking information sent by the cloud server, including owner and vehicle information, a request for querying remaining parking spaces, and reserved parking time;

the cloud server is configured to receive the information sent by the mobile APP and send the reserved parking time information to the computer system; host a database, receive the parking information sent by the computer system, automatically generate a pick-up account, a password, and a quick response (QR) code, and send them to the mobile APP for a user to pick up the vehicle; receive a parking space ID assigned by the computer system for the reserved parking, and send it to the mobile APP; and check verification information sent from the all-in-one touch machine;

the computer system is configured to receive the information from the cloud server, send information to and receive information from the PLC system through the Ethernet, and process the information; feedback the parking information to the cloud server; and automatically process the reserved vehicle, and retain reservation information for 20 minutes before and after the reservation time;

the PLC system is configured to receive a parking command from the computer system through the Ethernet, send the parking command to the stereo garage, receive a parked feedback from the stereo garage, and send parked information to the computer system;

the stereo garage is configured to park vehicles, where an execution part of the stereo garage is configured to receive the parking command sent by the PLC system, and send the parked feedback to the PLC system; and the all-in-one touch machine is configured to scan a QR code or enter an account and a password, provide vehicle pick-up services for vehicle owners, display the whole parking and pick-up process to users, and implement whole-process monitoring, where the all-in-one touch machine is equipped with a dynamic face recognition system, allowing vehicle owners to pick up vehicles by swiping the face.

Preferably, the mobile APP includes a password enabling system, a parking reservation module, a map calling module, a direct parking module, a password and QR code display module, a parking information display module, a video monitoring module, a service information module, a logistics support module, and a historical record display module, where the parking reservation module is configured to allow a vehicle owner to reserve a parking space in the stereo garage within a certain period of time;

the map calling module is configured to track vehicles in real time, select an optimal route for vehicle owners, and display the current number of remaining parking spaces in the stereo garage;

the direct parking module is configured for vehicle owners to directly park near the garage;

the password and QR code display module is configured to display an account, a password, and a QR code sent from the cloud server for vehicle pick-up;

the parking information display module is configured to display an ID of a parking space and start time of the parking in the stereo garage;

the video monitoring module is configured to check the vehicle status in real time;

the service information module is configured to perform services such as vehicle repair and maintenance, vehicle insurance recommendation, violation inquiry, fueling service, vehicle wash service, and used cars and member service;

the logistics support module is configured to contact customer service and give feedback; and the historical record display module is configured for vehicle owners to query all parking records and deductions.

Preferably, the computer system includes a website background management system and a host computer management system, where the website background management system is configured for background personnel to deal with problems reported by customers, and add new stereo garage locations;

the host computer management system is divided into three parts: a function area, a vehicle management record area, and a communication information area, where the function area includes a service enabling module, a user information module, an administrator module, a user adding module, a historical record module, and a faulty parking space module;

the service enabling module is configured to shut down an intelligent stereo garage;

the user information module is configured to store user and vehicle information and generated accounts and passwords from the cloud server;

the administrator module is configured for administrators to implement daily management and operations of the system;

the user adding module is configured for administrators to manually add vehicle owner information;

the historical record module is configured to query historical information of all parking spaces in all intelligent stereo garages;

the faulty parking space module is configured to indicate that a parking space is faulty or is under maintenance and has not been put into operation;

the vehicle management record area includes all parking spaces in a parking lot, where as long as a user uses the mobile APP for parking, the system automatically matches a parking space and returns a parking space ID to the mobile APP; the corresponding parking space in the vehicle management record area is displayed as "used", and real-time video of the parking space is displayed upon a click at the corresponding parking space ID; and the communication information area includes a server and a client, where the server communicates with the mobile APP, and the client communicates with the PLC system, and is configured to determine whether the communication is normal.

Preferably, the PLC system includes a CPU module, a network module, a digital value module, and a power module, where the CPU module is a Q-series PLC controller;

the network module is an Ethernet module or a CC-Link module; the Q-series PLC controller is connected to the host computer management system through the Ethernet module, and the Ethernet module performs PLC operation monitoring and status control, and receive any data over TCP/IP or UDP/IP; a CC-Link network formed by the CC-Link module is an open field bus able to simultaneously handle both control and information data and connect to the host computer management system through a bus to form a device layer network;

the digital value module is an input and output module of the CPU; and the power module is configured to supply continuous and stable power to the CPU module, the network module, and the digital value module on a main base board.

Preferably, the stereo garage includes a garage body, a roadway crane, a power supply unit, and an interface unit, where the roadway crane is configured to receive a control command sent by the PLC system;

the garage body includes a transfer area, a storage area, and a maintenance area, where the transfer area is used to temporarily park vehicles, and is equipped with an image detection and recognition device and a voice prompt device;

the image detection and recognition device is configured to recognize a license plate number and match it with the reservation information on the host computer management system of the computer system, so that the host computer management system sends corresponding commands to the PLC system; the image detection and recognition device can also detect whether there are people or animals inside a vehicle, and remind the user through the voice prompt device;

the storage area is used to accommodate vehicles, where each parking space is provided with a monitoring device; limit switches are provided on the left and right sides and below each parking space, and are configured to detect whether a vehicle has reached a specified location and control the brake of the roadway crane; a photoelectric switch is installed at the exit to automatically open and close the fence door when a vehicle reaches the entrance of the stereo garage;

the maintenance area is used for daily maintenance of vehicles, where when a user accesses the maintenance area of the service information module by using the mobile APP, and maintenance personnel receive maintenance information from the user and accept the maintenance request, the vehicle is automatically transferred to the maintenance area, the corresponding parking space is still reserved, and the maintenance personnel feed back the maintenance progress to the user; and the roadway crane, as an actuator, is configured to receive the control commands sent by the PLC system, and includes a two-axis walking mechanism, a delivery platform, and a driver, where the delivery platform automatically adjusts a width according to different vehicle sizes, and the driver is configured to control the delivery platform.

The present invention further provides a vehicle parking method. The method uses the stereo garage parking system described above, and specifically includes the following steps:

Step 1: A user uses the mobile APP to send owner and vehicle information, a request for querying the remaining parking spaces, and reserved parking time information to the cloud server; calls a map and selects a stereo garage with free parking spaces nearby by using the map calling module, and clicks the Reserve button to get an optimal route.

Step 2: The cloud server receives the information transmitted from the mobile APP and selects a parking space from the database; the user arrives at the transfer area of the stereo garage within a specified time; and the image detection and recognition device recognizes a vehicle and transmits vehicle information to the computer system.

Step 3: The host computer management system of the computer system recognizes the vehicle information, calls database information, and sends a control signal to the PLC system through the Ethernet.

Step 4: The PLC system sends a signal to the actuator to get it ready to automatically drag the vehicle; after the vehicle reaches the corresponding parking space of the stereo garage, the limit switches detect the arrival of the vehicle and a feedback signal is sent to the PLC system; and the PLC system sends a vehicle arrival signal to the computer system.

Step 5: An icon of the vehicle management record area of the computer system changes, and the computer system sends the vehicle arrival signal to the cloud server; and the cloud server automatically generates a pick-up account, a password, and a QR code, sends the information to the mobile APP, and starts timing.

The present invention further provides a vehicle pick-up method. The method uses the stereo garage parking system described above, and specifically includes the following steps:

Step 1: The user picks up the vehicle by scanning the QR code displayed on the mobile APP or entering the account and password on the all-in-one touch machine at the pick-up location.

Step 2: The cloud server verifies the password, calculates the parking time after the verification is successful, and sends a payment message according to the charging standard.

Step 3: The all-in-one touch machine displays a payment page with a payment QR code.

Step 4: After the payment is successful, the cloud server matches the database information and payment information.

Step 5: The cloud server sends a pick-up command to the computer system; the host computer management system of the computer system sends the pick-up command to the PLC system; and the PLC system controls the actuator to take out the vehicle.

Step 6: The transfer area automatically recognizes the arriving vehicle, the information in the host computer management system of the computer system is modified, server data is modified, a historical record is added, and the user status is modified.

The beneficial effects brought by the present invention are as follows:

The present invention provides an intelligent stereo garage system based on Internet+ and vehicle parking and pick-up methods. A fully automatic parking method is used. In addition, a pick-up mode is different from a parking mode, which technically ensures that users can get their vehicles in time without hindering other users, and allows users to truly experience the system intelligence. This deeply embodies the smart city's idea of interconnecting everything with a mobile phone. In addition, the intelligent stereo garage system and the vehicle parking and pick-up methods are safe, reliable, and intelligent, which largely solve the problems such as parking difficulty, illegal parking, unauthorized charges, traffic jams, traffic noise, traffic accidents, and vehicle pollution, and conform to the current development trend.

In the figure, 10. mobile APP, 101. password enabling system, 102. parking reservation module, 103. map calling module, 104. direct parking module, 105. password and QR code display module, 106. parking information display module, 107. video monitoring module, 108. service information module, 109. logistics support module, 110. historical record display module, 20. cloud server, 30. computer system, 301. website background management system, 302. host computer management system, 3021. function area, 30211. service activation module, 30212. user information module, 30213. administrator module, 30214. user adding module, 30215. historical record module, 30216. faulty parking space module, 3022. communication information area, 30221. server, 30222. client, 3023. vehicle management record area, 31. image detection and recognition device, 32. voice prompt device, 40. PLC system, 41. roadway crane, 42. two-axis walking mechanism, 43. delivery platform, 44. driver, 45. limit switch, 46. photoelectric switch, 50. stereo garage, and 60. all-in-one touch machine.

DETAILED DESCRIPTION

The present invention is described in more detail below with reference to the accompanying drawings and specific implementations.

Example 1

Figure 1:
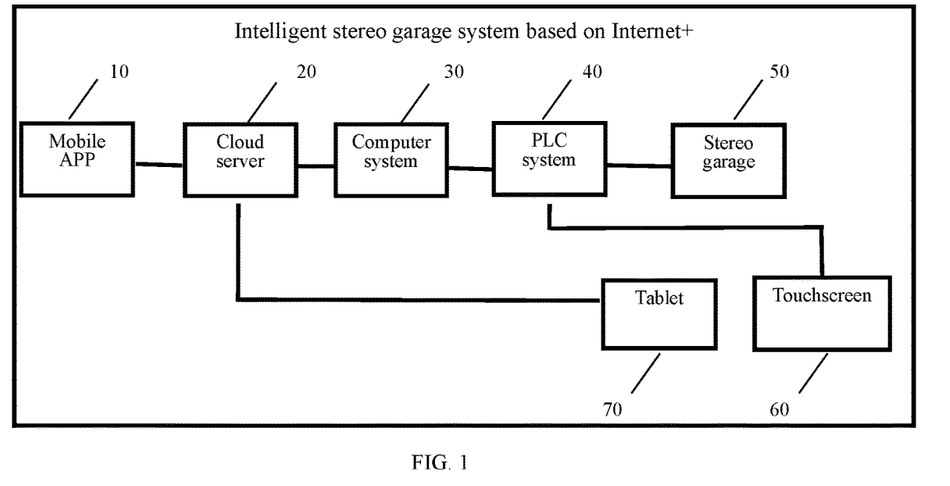
FIG. 1 is a structural diagram of an intelligent stereo garage system based on Internet+ according to the present invention.
Figure 2:
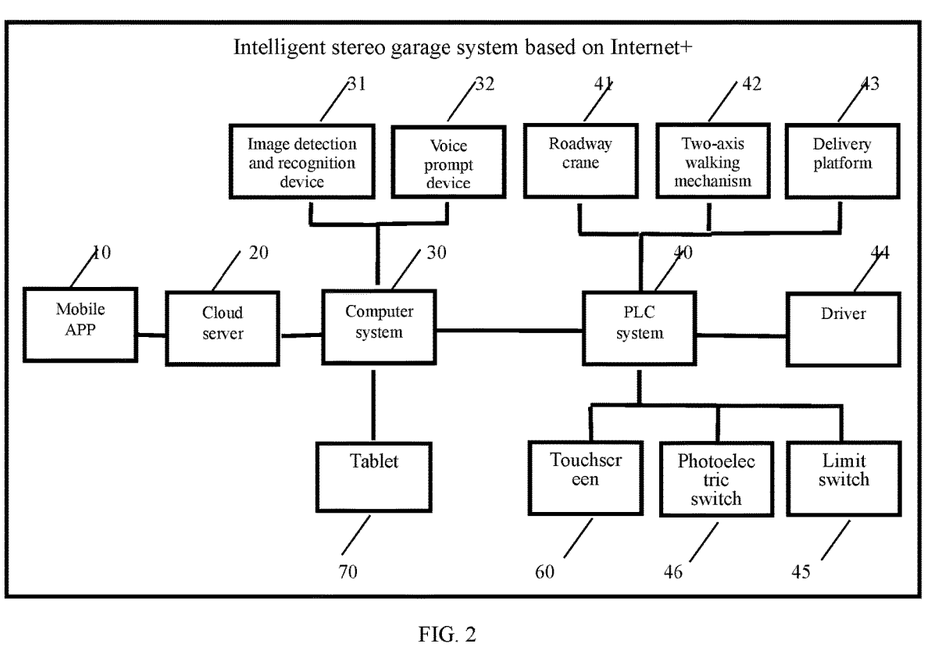
FIG. 2 is a schematic structural diagram of an intelligent stereo garage system based on Internet+ according to the present invention.

As shown in FIG. 1 and FIG. 2, an intelligent stereo garage system based on Internet+ includes a mobile APP 10, a cloud server 20, a computer system 30, a PLC system 40, a stereo garage 50, and an all-in-one touch machine 60. The all-in-one touch machine 60 is deployed next to the stereo garage 50, and the computer system 30 is deployed outside or inside the stereo garage 50.

Figure 3:
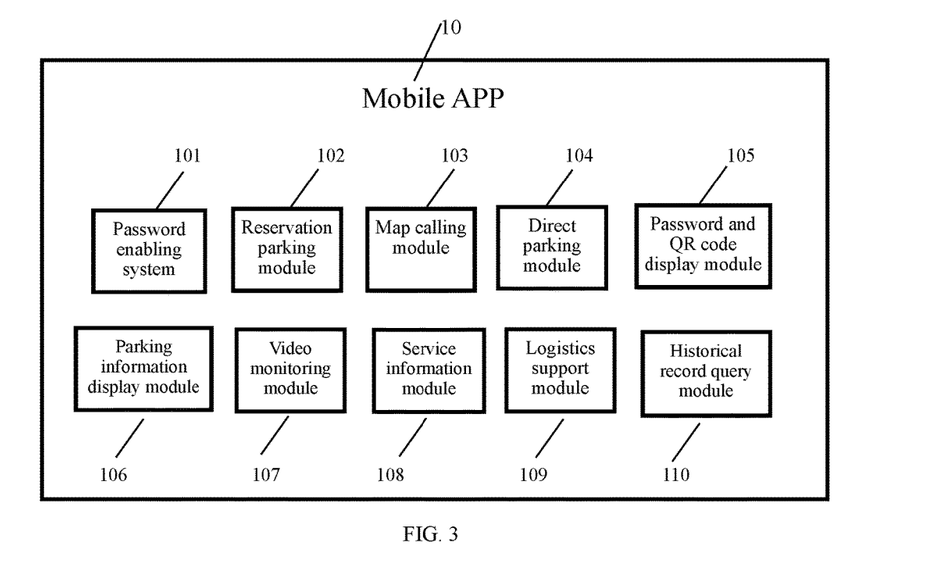
FIG. 3 is a schematic structural diagram of a mobile APP in an intelligent stereo garage system based on Internet+ according to the present invention.

FIG. 3 shows a structure of the mobile APP 10. The mobile APP 10 is used to search for a stereo garage with free parking spaces nearby, and send owner and vehicle information, a request for querying remaining parking spaces, and reserved parking time to the cloud server 20. The mobile APP 10 includes a password enabling system 101, configured to prevent others from opening the software to pick up the user's vehicle; a map calling module 103, configured to track the vehicle in real time, select an optimal route for the vehicle owner, and display the current number of remaining spaces in the stereo garage 50; a parking reservation module 102; a direct parking module 104; a password and QR code display module 105, configured to display a pick-up account, a 10-digit password, and a QR code sent from the cloud server 20 for vehicle pick-up; a parking information display module 106, configured to display an ID of a parking space number and start time of the parking in a three-dimensional parking garage 50; a video monitoring module 107, configured to allow users to view their vehicles in the parking spaces in real time; a service information module 108, which includes vehicle repair and maintenance, vehicle insurance recommendation, violation inquiry, fueling service, vehicle wash service, and used cars and member service; a logistics support module 109, which includes contact customer service and feedback; and a historical record display module 110, configured to record all parking information of vehicle owners. The use of the mobile APP 10 improves the parking space utilization and traffic speed of the stereo garage, can introduce more customers to parking lots, and allows users to park and pick up vehicles more intelligently and conveniently.

The cloud server 20 exchanges information with the mobile APP 10 and the all-in-one touch machine 60 through the Restful technology. The cloud server receives the information sent by the mobile APP, and sends the reserved parking time information to the computer system 30 through web socket; receives a parking space ID allocated by the computer system 30 and sends it to the mobile APP 10; receives parked information sent by the computer system 30, automatically generates a pick-up account, a 10-digit password, and a QR code, and sends them to the mobile APP 10 for vehicle pick-up; and checks verification information sent from the all-in-one touch machine.

Figure 4:
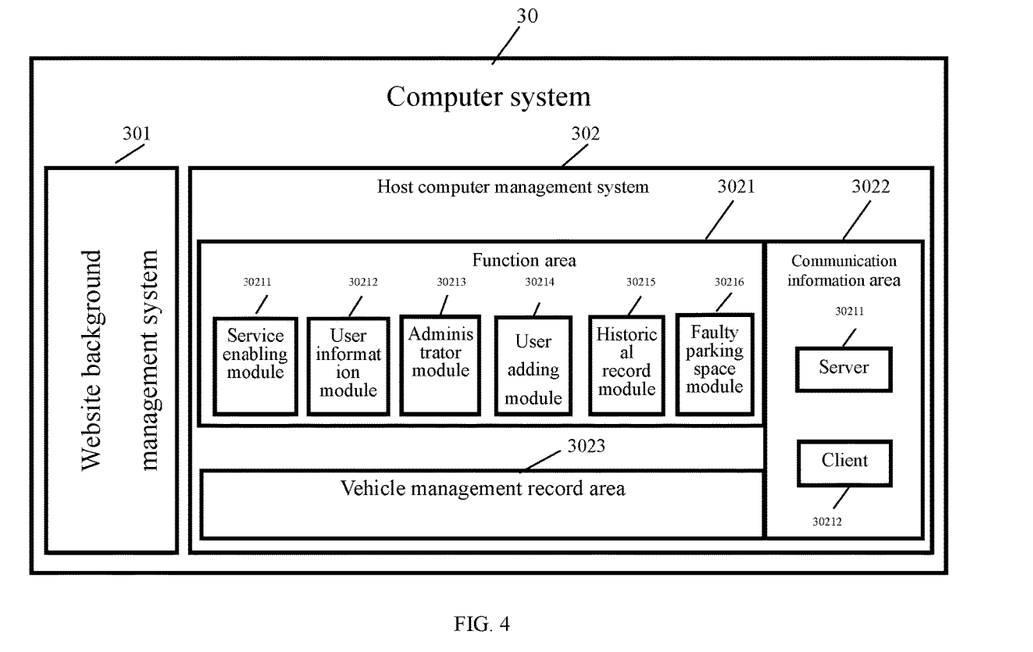
FIG. 4 is a schematic structural diagram of a computer system in an intelligent stereo garage system based on Internet+ according to the present invention.

FIG. 4 shows a structure of the computer system 30. The computer system 30 is configured to receive the information sent by the cloud server 20; perform add, delete, modify, and query operations on a database; receive and process information from the PLC system 40 through the Ethernet, display the parked vehicles in a vehicle management record area 3023, and send parking information (parking space ID) to the cloud server 20; and automatically process reserved vehicles and retain reservation information for 20 minutes before and after the reservation time. The computer system is divided into two parts: a website background management system 301 and a host computer management system 302.

The website background management system 301 is configured for background personnel to deal with problems reported by customers, actively respond to users' comments and complaints, and add new stereo garage locations.

The host computer management system 302 is divided into three parts: a function area 3021, a communication information area 3022, and the vehicle management record area 3023. The host computer management system uses a C/S architecture. The function area 3021 includes a service enabling module 30211, a user information module 30212, an administrator module 30213, a user adding module 30214, a historical record module 30215, and a faulty parking space module 30216. The user and vehicle information and generated passwords sent from the cloud server 20 are stored in the user information module 30212. In case that the user's mobile phone is out of power or the mobile phone is lost, the user can go to the background management service of the stereo garage 50 with relevant documents and pick up the vehicle with their help. The vehicle management record area 3023 contains all parking spaces in a parking lot. As long as the user uses the mobile APP 10 to park the vehicle, the system automatically matches a parking space and returns an ID of the parking space to the mobile APP 10. At this time, the corresponding parking space in the vehicle management record area 3023 is displayed as "used". Videos of vehicles in the parking spaces can be called in real time upon a click on the parking space IDs. The communication information area 3022 includes two parts: a server 30221 and a client 30222. The server 30221 communicates with the mobile APP 10 and displays the online rate of mobile phones in real time, so that administrators can start a plurality of vehicle delivery devices to improve the operating efficiency of the stereo garage during commutation peak hours. The client 30222 communicates with the PLC system 40, ensures normal Ethernet communication, and displays successful monitoring and communication upon successful connection.

The PLC system 40 uses Ethernet to receive a parking command sent by the computer system 30, and sends the parking command to the stereo garage 50; and receives parked information fed back by the stereo garage 50 and reports it in real time to the host computer management system 302. The PLC system 40 includes a CPU module, a network module, a digital value module, and a power module. The CPU module is a Q-series PLC controller. The Q-series PLC controller has a wide range of functions and powerful performance. The network module is an Ethernet module or a CC-Link module. The Q-series PLC controller is connected to the host computer management system 302 through the Ethernet module. The Ethernet module performs PLC operation monitoring and status control and receives any data over TCP/IP or UDP/IP. A CC-Link network formed by the CC-Link module is an open field bus able to simultaneously handle both control and information data and connect to the host computer management system through a simple bus to form a device layer network. The digital value module is an input and output module of the CPU. The power module supplies continuous and stable power to the CPU module, the network module, and the digital value module on a main base board.

The stereo garage 50 includes a garage body, a roadway crane 41, a power supply unit, and an interface unit. The stereo garage is in a fully closed state, and only maintenance personnel can enter the stereo garage.

The garage body includes a transfer area, a storage area, and a maintenance area. The transfer area is used to temporarily park vehicles. The transfer area is equipped with an image detection and recognition device 31 and a voice prompt device 32. The image detection and recognition device 31 recognizes a license plate number and matches it with the reservation information in the host computer management system 302 of the computer system, and then the host computer management system 302 sends corresponding commands to the PLC system 40. The image detection and recognition device 31 can detect whether there are people or animals in the vehicle, and remind the user in time through the voice prompt device 32. The storage area is used to park vehicles. Each parking space has a monitoring device to allow users to view their vehicles in real time. There are limit switches 45 on the left and right sides and below each parking space to detect whether the vehicle has reached a specified location, and control the braking of the roadway crane 41. A photoelectric switch 46 installed at the exit is configured to control a fence door to open or close when the vehicle reaches the entrance of the stereo garage. The PLC system 40 detects the status of the limit switches 45 and the photoelectric switch 46; reads information of a control and execution part of the stereo garage 50, and makes logical judgment; controls a delivery platform 43 to move to park or pick up the vehicle; and works with photoelectric detection, software and hardware signal interlocking, position limit, fall protection, and overload protection devices to ensure the safe, stable, and reliable operation of the system. The maintenance area is used for the daily maintenance of vehicles. The user accesses the maintenance area of the service information module on the mobile APP 10, and describes the problem and the desired maintenance. After the maintenance personnel receive the information and accept the maintenance request, the stereo garage automatically transfers the vehicle to the maintenance area for inspection and maintenance. The parking space is still reserved. The maintenance personnel reports the maintenance progress to the user, so that the user can arrange the schedule in time.

As an actuator, the roadway crane 41 includes a two-axis walking mechanism 42, the delivery platform 43, and a driver 44. The roadway crane 41 is configured to receive a control command sent by the PLC system 40. The roadway crane 41 can move up and down, left and right. The delivery platform 43 automatically adjusts the width according to different vehicle sizes. The delivery platform 43 has more than a dozen teeth that can be automatically retracted. When a vehicle is relatively narrow, all the teeth are in the middle position. When a vehicle is relatively wide, these teeth are adjusted by rollers to extend out crossly. The driver 44 is configured to control the delivery platform 43.

The all-in-one touch machine 60 is configured to verify user information and provide vehicle pick-up services for users. The all-in-one touch machine 60 is deployed next to the stereo garage 50. The user must correctly enter the user's account and 10-digit password or scan the QR code on the user's mobile phone to connect to the cloud server 20 for password verification. After the verification is successful, the cloud server 20 calculates the parking time, and sends a payment message according to the charging standard. The all-in-one touch machine 60 displays a payment page with a QR code for payment. After the payment is successful, the cloud server 20 sends a pick-up command to the computer system 30. The computer system sends the pick-up command to the PLC system 40, and instructs the garage to perform the vehicle pick-up operation to ensure that the user can pick up the vehicle in time without hindering others. After the vehicle pick-up is successful, the cloud server modifies the server data, adds a historical record, and modifies the user status. The all-in-one touch machine can also display the entire parking or pick-up process to the user. The all-in-one touch machine has a built-in dynamic face recognition system. The user can pick up the vehicle through face recognition.

Example 2

Figure 5:
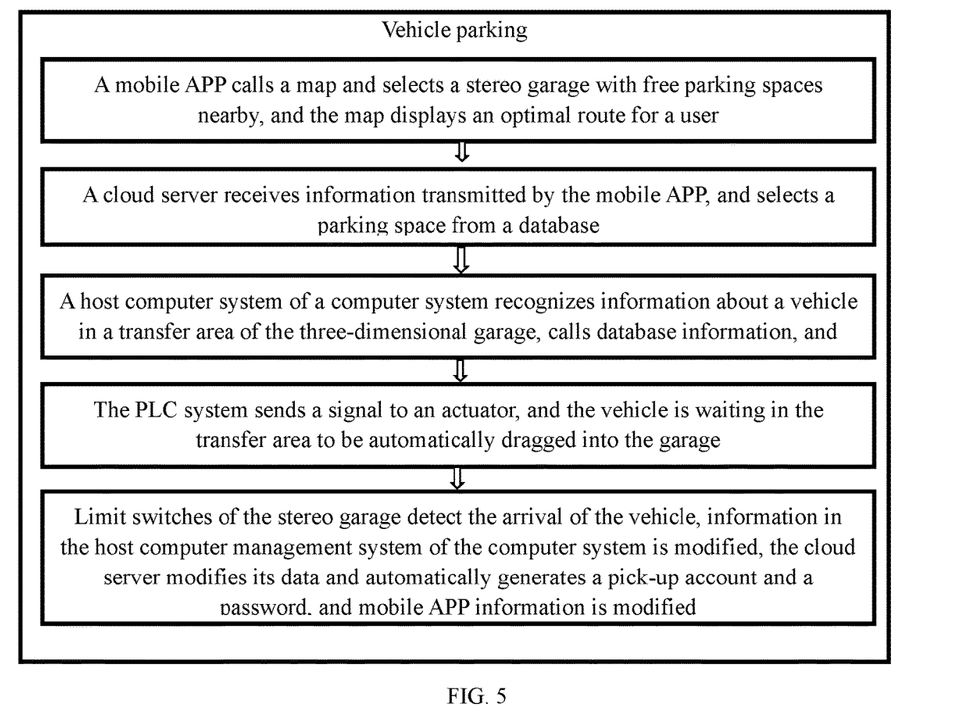
FIG. 5 is a block diagram of a vehicle parking process according to the present invention.

Based on Example 1, the present invention further provides a vehicle parking method. This brand-new vehicle parking method technically ensures that users can get their vehicles in time without hindering other users, truly realizing separation of people and vehicles. The process is shown in FIG. 5 and specifically includes the following steps:

Step 1: A user uses the mobile APP to send owner and vehicle information, a request for querying the remaining parking spaces, and reserved parking time information to the cloud server; calls a map and selects a stereo garage with free parking spaces nearby by using the map calling module, and clicks the Reserve button to get an optimal route.

Step 2: The cloud server receives the information transmitted from the mobile APP and selects a parking space from the database; the user arrives at the transfer area of the stereo garage within a specified time; and the image detection and recognition device recognizes a vehicle and transmits vehicle information to the computer system.

Step 3: The host computer management system of the computer system recognizes the vehicle information, calls database information, and sends a control signal to the PLC system through the Ethernet.

Step 4: The PLC system sends a signal to the actuator to get it ready to automatically drag the vehicle; after the vehicle reaches the corresponding parking space of the stereo garage, the limit switches detect the arrival of the vehicle and a feedback signal is sent to the PLC system; and the PLC system sends a vehicle arrival signal to the computer system.

Step 5: An icon of the vehicle management record area of the computer system changes, and the computer system sends the vehicle arrival signal to the cloud server; and the cloud server automatically generates a pick-up account, a password, and a QR code, sends the information to the mobile APP, and starts timing.

Example 3

Figure 6:
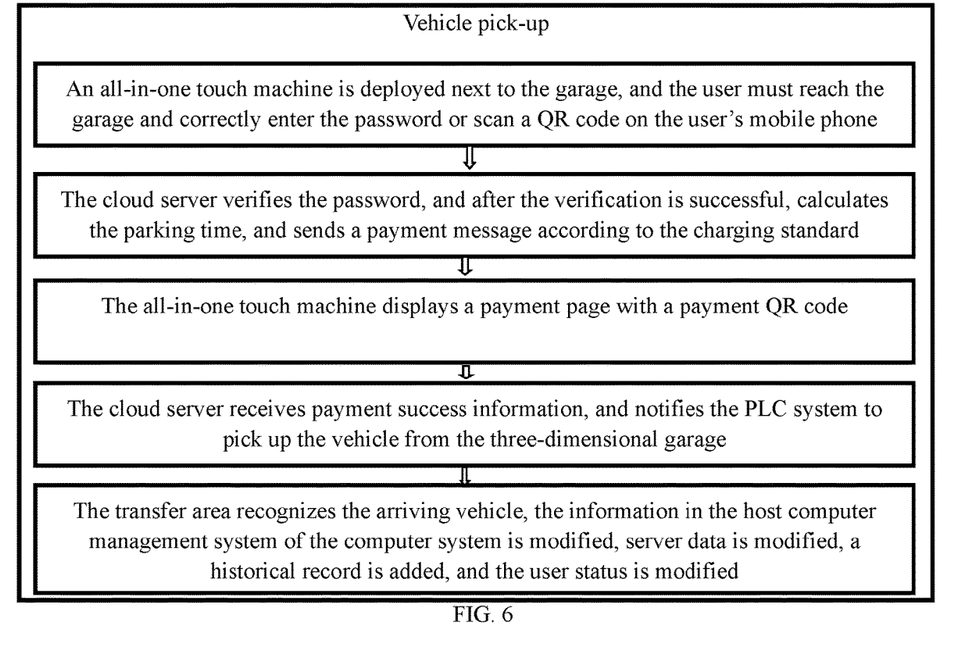
FIG. 6 is a block diagram of a vehicle pick-up process according to the present invention.

Based on Example 1, the present invention further provides a vehicle pick-up method. This brand-new vehicle pick-up method technically ensures that users can get their vehicles in time without hindering other users, truly realizing separation of people and vehicles. The process is shown in FIG. 6 and specifically includes the following steps:

Step 1: The user picks up the vehicle by scanning the QR code displayed on the mobile APP or entering the account and password on the all-in-one touch machine at the pick-up location.

Step 2: The cloud server verifies the password, calculates the parking time after the verification is successful, and sends a payment message according to the charging standard.

Step 3: The all-in-one touch machine displays a payment page with a payment QR code.

Step 4: After the payment is successful, the cloud server matches the database information and payment information.

Step 5: The cloud server sends a pick-up command to the computer system; the host computer management system of the computer system sends the pick-up command to the PLC system; and the PLC system controls the actuator to take out the vehicle.

Step 6: The transfer area automatically recognizes the arriving vehicle, the information in the host computer management system of the computer system is modified, server data is modified, a historical record is added, and the user status is modified.

It should be noted that the above description is not intended to limit the present invention, and the present invention is not limited to the above examples. Changes, modifications, additions or replacements made by those of ordinary skill in the art within the essential range of the present invention should fall within the protection scope of the present invention.

What is claimed is:

1. An intelligent stereo garage system based on Internet+, comprising: a mobile phone, a cloud server, a computer system, a programmable logic controller (PLC) system, a stereo garage, and an all-in-one touch machine,
   wherein the all-in-one touch machine is deployed next to the stereo garage, and the computer system is deployed outside or inside the stereo garage;
   the mobile phone is configured to search for the stereo garage with free parking spaces, send a command to the cloud server, and receive parking information sent by the cloud server, wherein the command comprises user and vehicle information, a request for querying remaining parking spaces, and reserved parking time;
   the cloud server is configured to receive the user and vehicle information, the request for querying the remaining parking spaces, and the reserved parking time sent by the mobile phone and send reserved parking time information to the computer system; the cloud server is further configured to host a database, receive the parking information sent by the computer system, automatically generate a pick-up account, a password, and a quick response (QR) code, and send the pick-up account, the password, and the QR code to the mobile phone for a user to pick up a vehicle; the cloud server is further configured to receive a parking space ID assigned by the computer system for a reserved parking, and send the parking space ID to the mobile phone; and the cloud server is further configured to check verification information sent from the all-in-one touch machine;

the computer system is configured to receive the reserved parking time information from the cloud server, send a parking command to and receive parked information from the PLC system through an Ethernet, and process the parking information; feedback the parking information to the cloud server; and automatically process a reserved vehicle, and retain reservation information for 20 minutes before and after the reserved parking time;

the PLC system is configured to receive the parking command from the computer system through the Ethernet, send the parking command to the stereo garage, receive a parked feedback from the stereo garage, and send the parked information to the computer system;

the stereo garage is configured to park vehicles, wherein an actuator of the stereo garage is configured to receive the parking command sent by the PLC system, and send the parked feedback to the PLC system; and the all-in-one touch machine is configured to scan the QR code or enter the pick-up account and the password, provide vehicle pick-up services for the user, display a whole parking and pick-up process to the user, and implement whole-process monitoring, wherein the all-in-one touch machine is equipped with a face recognition system, allowing the user to pick up the vehicle by swiping a face of the user.

2. The intelligent stereo garage system based on Internet+ according to claim 1, wherein the mobile phone comprises an application program, the application program is executed to:

allow the user to reserve a parking space in the stereo garage within a period of time;

track the vehicle in real time, select an optimal route for the vehicle, and display a current number of the remaining parking spaces in the stereo garage;

directly park near the stereo garage for the vehicle;

display the pick-up account, the password, and the QR code sent from the cloud server for vehicle pick-up;

display an ID of the parking space and start time of parking in the stereo garage;

check a vehicle status in real time;

provide services comprising vehicle repair and maintenance, vehicle insurance recommendation, violation inquiry, fueling service, vehicle wash service, and used cars and member service;

contact customer service and give feedback; and query all parking records and deductions for the user.

3. The intelligent stereo garage system based on Internet+ according to claim 1, wherein the computer system comprises a website background management system and a host computer management system, wherein the website background management system is configured for background personnel to deal with problems reported by customers, and add new stereo garage locations;

the host computer management system is divided into three parts: a function area, a vehicle management record area, and a communication information area, wherein the function area comprises a service enabling module, a user information module, an administrator module, a user adding module, a historical record module, and a faulty parking space module;

the service enabling module is configured to shut down an intelligent stereo garage;

the user information module is configured to store user and vehicle information and generated accounts and passwords from the cloud server;

the administrator module is configured for administrators to implement daily management and operations of the intelligent stereo garage system;

the user adding module is configured for administrators to manually add vehicle user information;

the historical record module is configured to query historical information of all parking spaces in all intelligent stereo garages;

the faulty parking space module is configured to indicate that a parking space is faulty or is under maintenance and has not been put into operation;

the vehicle management record area comprises all parking spaces in a parking lot, wherein when the user uses the application program on the mobile phone for parking, the intelligent stereo garage system automatically matches the parking space and returns the parking space ID to the mobile phone; the parking space in the vehicle management record area is displayed as "used", and a real-time video of the parking space is displayed upon a click at the parking space ID; and the communication information area comprises a server and a client, wherein the server communicates with the mobile phone, and the client communicates with the PLC system, and is configured to determine whether communication is normal.

4. The intelligent stereo garage system based on Internet+ according to claim 3, wherein the PLC system comprises a CPU module, a network module, a digital value module, and a power module, wherein the CPU module is a Q-series PLC controller;

the network module is an Ethernet module or a CC-Link module; the Q-series PLC controller is connected to the host computer management system through the Ethernet module, and the Ethernet module performs PLC operation monitoring and status control, and receive any data over TCP/IP or UDP/IP; a CC-Link network formed by the CC-Link module is an open field bus able to simultaneously handle both control and information data and connect to the host computer management system through a bus to form a device layer network;

the digital value module is an input and output module of the CPU module; and the power module is configured to supply continuous and stable power to the CPU module, the network module, and the digital value module on a main base board.

5. The intelligent stereo garage system based on Internet+ according to claim 3, wherein the stereo garage comprises a garage body, a roadway crane, a power supply unit, and an interface unit, wherein the roadway crane is configured to receive a control command sent by the PLC system;

the garage body comprises a transfer area, a storage area, and a maintenance area, wherein the transfer area is configured to temporarily park vehicles, and is equipped with an image detection and recognition device and a voice prompt device;

the image detection and recognition device is configured to recognize a license plate number and match the license plate number with the reservation information on the host computer management system of the computer system, so that the host computer management system sends corresponding commands to the PLC system; the image detection and recognition device can also detect whether there are people or animals inside the vehicle, and remind the user through a voice prompt device;

the storage area is configured to accommodate vehicles, wherein each parking space is provided with a monitoring device; limit switches are provided on left and right sides and below each parking space, and are configured to detect whether the vehicle has reached a specified location and control the brake of the roadway crane; a photoelectric switch is installed at an exit to automatically open and close a fence door when the vehicle reaches the entrance of the stereo garage;

the maintenance area is configured for daily maintenance of vehicles, wherein when the user accesses the maintenance area of the service information module by using the application program, and maintenance personnel receive maintenance information from the user and accept a maintenance request, the vehicle is automatically transferred to the maintenance area, the parking space is still reserved, and the maintenance personnel feedback a maintenance progress to the user; and the roadway crane, as the actuator, is configured to receive the control command sent by the PLC system, and comprises a two-axis walking mechanism, a delivery platform, and a driver, wherein the delivery platform automatically adjusts a width according to a vehicle size, and the driver is configured to control the delivery platform.

6. A vehicle parking method for the intelligent stereo garage system according to claim 1, the method comprising:
   step 1: by the mobile phone, sending the user and vehicle information, the request for querying the remaining parking spaces, and reserved parking time to the cloud server; calling a map and selecting the stereo garage with the free parking spaces nearby, and getting an optimal route;
   step 2: by the cloud server, receiving the user and vehicle information, the request for querying the remaining parking spaces, and the reserved parking time transmitted from the mobile phone and selecting the parking space from the database; and when the user arrives at a transfer area of the stereo garage within a specified time, by an image detection and recognition device, recognizing the vehicle and transmitting vehicle information to the computer system;
   step 3: by a host computer management system of the computer system, recognizing the vehicle information, calling database information, and sending a control signal to the PLC system through the Ethernet;
   step 4: by the PLC system, sending a signal to the actuator to get ready to automatically drag the vehicle; after the vehicle reaches the parking space of the stereo garage, by limit switches, detecting an arrival of the vehicle and sending a feedback signal to the PLC system; and by the PLC system, sending a vehicle arrival signal to the computer system;
   step 5: by the computer system, changing an icon of a vehicle management record area of the computer system, and sending the vehicle arrival signal to the cloud server; and by the cloud server, automatically generating the pick-up account, the password, and the QR code, sending the pick-up account, the password, and the QR code to the mobile phone, and starting timing.

7. A vehicle pick-up method for the intelligent stereo garage system according to claim 1, the method comprising:
   step 1: picking up the vehicle by scanning the QR code displayed on the mobile phone or entering the pick-up account and password on the all-in-one touch machine at a pick-up location;
   step 2: by the cloud server, verifying the password, calculating parking time after verification is successful, and sending a payment message according to a charging standard;
   step 3: by the all-in-one touch machine, displaying a payment page with a payment QR code;
   step 4: after a payment is successful, by the cloud server, matching the database information and payment information;
   step 5: by the cloud server, sending a pick-up command to the computer system; by a host computer management system of the computer system, sending the pick-up command to the PLC system; and by the PLC system, controlling the actuator to take out the vehicle;
   step 6: by a transfer area, automatically recognizing an arrival of the vehicle, modifying the parking information in the host computer management system of the computer system and server data, adding a historical record, and modifying a user status.

* * * * *

UNITED STATES PATENT AND TRADEMARK OFFICE
CERTIFICATE OF CORRECTION

| | | |
|---|---|---|
| PATENT NO. | : 11,954,616 B2 | Page 1 of 1 |
| APPLICATION NO. | : 16/977289 | |
| DATED | : April 9, 2024 | |
| INVENTOR(S) | : Sui et al. | |

It is certified that error appears in the above-identified patent and that said Letters Patent is hereby corrected as shown below:

On the Title Page

Item (72), Inventor Chuanzhen SUN address, "Shangdong" should be --Shandong--.

Item (72), Inventor Xiuzhi LIU address, "Shangdong" should be --Shandong--.

Item (72), Inventor Shengrun GUO address, "Shangdong" should be --Shandong--.

Item (72), Inventor Zhizhong HUO address, "Shangdong" should be --Shandong--.

Signed and Sealed this
Twentieth Day of May, 2025

Coke Morgan Stewart
*Acting Director of the United States Patent and Trademark Office*